(No Model.)

J. BOWERS.
WIRE FENCE.

No. 531,899. Patented Jan. 1, 1895.

Witnesses
Harry L. Amer
J. A. Queneau

By his Attorneys,
C. A. Snow & Co.

Inventor
Jacob Bowers.

UNITED STATES PATENT OFFICE.

JACOB BOWERS, OF NEW PARIS, PENNSYLVANIA.

WIRE FENCE.

SPECIFICATION forming part of Letters Patent No. 531,899, dated January 1, 1895.

Application filed August 6, 1894. Serial No. 519,599. (No model.)

*To all whom it may concern:*

Be it known that I, JACOB BOWERS, a citizen of the United States, residing at New Paris, in the county of Bedford and State of Pennsylvania, have invented a new and useful Wire Fence, of which the following is a specification.

This invention has particular reference to that class of fences wherein a series of wooden slats or pickets are strung upon horizontal running-wires, and the principal object of the invention is to provide a brace or stay-wire which will operate to prevent the running-wires from sagging intermediate of the posts.

A further object is to provide means for permitting the expansion and contraction of the wires, and for keeping them taut notwithstanding such variations in their lengths.

Various other objects are contemplated, such as simplicity, durability and cheapness, and the full attainment of all will be apparent from the following specification.

In the drawings: Figure 1 represents a perspective view of a portion of a fence constructed after the manner of my invention; Fig. 2, an enlarged sectional view taken longitudinally with the fence, and showing the operation of the supporting wire or stay, together with the tension-regulating devices; Fig. 3, a view illustrative of a device for retaining the position of the fence irrespective of irregularities in the surface of the ground.

I have shown one end of a fence constructed after my invention, and have broken away the structure a short distance beyond said end, illustrating enough to show the construction of the fence. Therefore the numeral 1 indicates one of the end posts of the fence, which is planted in the ground as usual, and which is formed by preference of wood. 2 indicates a brace, which I deem advisable to provide for the post 1, and 3 a water-shedding cap, all of which will be readily understood.

Formed in the post 1, and extending horizontally therein, and in longitudinal alignment with the line of the fence, are the openings 4, which are preferably two in number and which communicate with the side of the post opposite to the side adjacent to the fence. Communicating with the openings 4, and axially coincident thereto, are the passages 5, which pass out to the opposite side of the post 1. Through these passages 5 the bolts 6 respectively pass, while the heads of the bolts are enlarged to form the disks 7, which fit within the openings 4 and operate to confine the expansive springs 8 therein.

The arrangement of the bolts 6 is such that at no time will the heads 7 project beyond the post 1. The purpose of this is to prevent any unsightly or inconvenient projection from the side of the post adjacent to the opening 4, which projection would prevent the application of a gate and be disadvantageous in many other respects. The threaded ends of the bolts 6 project inwardly toward the fencing, and are respectively passed through the openings 9 in the supplemental post 10. Each of the bolts is provided with a nut 11, by which they may be tightened, and by which the supplemental post 10 may be drawn toward the post 1, or the springs 8 compressed, which result will follow the tightening of the nuts 11 which will be determined by the tension of the wires composing the fence. If the wires be taut, the springs will contract; but if the wires be slack, the post will be caused to move up.

The supplemental post 10 is arranged above the surface of the ground and is supported by the bolts 6.

12 indicates the running-wires, which are by preference six in number, but which may be varied in this respect at the will of the builder. The wires 12 are each passed through a small passage 13 in the post 10, and thence around one side thereof and back to the respective wires to which they are joined by coiling, as will be seen. From the supplemental post 10 the wires 12 extend to the intermediate posts 14, through the openings 15 of which they pass and proceed along the line of fencing, as will be understood. Located midway the posts 10 and 14 is the false post 16, which is mounted upon the wires 12 as the slats 17, and which differs therefrom only in its size and consequent strength. This false post 16 is, of course, present throughout the entire extent of the fence and is arranged midway between the intermediate posts 14.

The intermediate posts 14, and the supplemental post 10, are arranged to project above the level of the pickets 17 and above the main or end post 1, and this for a purpose which will hereinafter appear.

The pickets 17 are formed of wooden slats, provided with openings 18, whereby they are strung or threaded upon the wires 12, and they may be arranged at various equidistant points along the wires and secured therein by wedges or keys 19, which are passed through the said openings and made to bind against the wires. I have not shown the keys 19 at every opening in the several pickets, but it will be understood that in practice this will be done, though it may not be absolutely essential.

Permanently and rigidly secured to the upper extremity of the supplemental post 10 is the stay wire or brace 20, which passes downwardly and inwardly therefrom and intersects with the lines of the running-wires at points directly adjacent to the several pickets 17, so that it will be possible for the wire 20 to pass through the adjacent openings of said pickets. In this direction the wire 20 continues until the lower extremity of the false post 16 is reached, whereupon the wire is passed through the opening in said lower extremity, along with the lower running-wire 12. From this point the wire 20 proceeds upwardly to the upper extremity of the intermediate post 14, through the opening 21 of which it passes, while it is passed through the several openings in the pickets 17 which are adjacent to running-wires at the points where the wire 20 intersects said running-wires.

From the intermediate post 14 the wire 20 proceeds downwardly and inwardly, as from the post 10, to the adjacent false post, not shown, and so on, as explained, throughout the length of the fence.

It will be observed that the operation of the stay-wire 20 results in a raising of the fence between the intermediate posts and between the posts 10 and the adjacent intermediate post, and in preventing the sagging of such portions of the fence and their engagement with the ground.

Owing to the passing of the wire 20 through the openings 18 of the pickets, the wire is made to pull uniformly upon the fence, and in the exact center thereof, thus preventing the fence from being twisted or wrenched to one side, as would be and as is the case in fences where the stay-wire passes alongside the fence rather than through it as in my invention. By passing the wire 20 through the intermediate posts at points above the upper ends of the pickets the wire is made capable of raising the fence, which would not be easy were the said intermediate posts only level with the pickets.

Fig. 3 illustrates a device for causing the fence to retain the same relation to the ground notwithstanding irregularities in the surface thereof, and this consists in a post 22 planted in the ground at the lowest point of a depression and directly below one of the pickets 17. 23 indicates a staple, which is passed through or around the lower running wire and driven into the upper end of the post 22, thus holding the fence down in the depression in the surface of the ground.

It is obvious that my invention is subject to various changes in the size, proportion and arrangement of its parts without departing from the spirit and scope thereof.

It will be understood that the intermediate posts 14 are extended at equidistant points throughout the fence, though I have shown but one in the drawings. This will account for the use of the plural number in describing such posts.

Having thus described the invention, I claim—

A fence comprising two rigid posts, a series of running wires stretched from one post to the other, a series of vertically-extending pickets threaded on the wires and arranged equidistant from each other, and a stay-wire secured to the upper extremity of each post and extending downwardly from each post to the middle picket of the series between the two posts, and intersecting each picket at one of the points of its intersection with the running wires, the stay wire being passed through the adjacent opening of each picket and through the opening at the lower end of each middle picket, substantially as described.

In testimony that I claim the foregoing as my own I have hereto affixed my signature in the presence of two witnesses.

JACOB BOWERS.

Witnesses:
  JNO. P. REED,
  J. FRANK REED.